(12) United States Patent
Yao et al.

(10) Patent No.: US 11,151,422 B2
(45) Date of Patent: Oct. 19, 2021

(54) EMPTY CONTAINER IDENTIFICATION METHOD AND SYSTEM

(71) Applicants: Nuctech Company Limited, Beijing (CN); Tsinghua University, Beijing (CN)

(72) Inventors: Yanjie Yao, Beijing (CN); Yongchun Liu, Beijing (CN); Yan Zhang, Beijing (CN); Ziran Zhao, Beijing (CN); Li Zhang, Beijing (CN); Yuxiang Xing, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 39 days.

(21) Appl. No.: 16/725,926

(22) Filed: Dec. 23, 2019

(65) Prior Publication Data
US 2020/0210785 A1    Jul. 2, 2020

(30) Foreign Application Priority Data
Dec. 28, 2018  (CN) .......................... 201811632412.1

(51) Int. Cl.
*G06K 9/62*  (2006.01)
*G06K 9/20*  (2006.01)
(Continued)

(52) U.S. Cl.
CPC ....... *G06K 9/6265* (2013.01); *G06F 16/5866* (2019.01); *G06K 9/00832* (2013.01);
(Continued)

(58) Field of Classification Search
CPC ............. G06K 9/6265; G06K 9/00832; G06K 9/2018; G06K 9/2054; G06K 9/6257;
(Continued)

(56) References Cited

U.S. PATENT DOCUMENTS

| 7,596,275 | B1 | 9/2009 | Richardson et al. |
| 2018/0157932 | A1* | 6/2018 | Gu ........................ G06K 9/6227 |
| 2018/0195977 | A1* | 7/2018 | Wang ........................ G06T 5/50 |

OTHER PUBLICATIONS

Search Report and Written Opinion for Netherlands Patent Application No. 2024575 dated Jun. 3, 2021, 10 pages.

* cited by examiner

*Primary Examiner* — David F Dunphy
(74) *Attorney, Agent, or Firm* — Merchant & Gould P.C.

(57) ABSTRACT

Empty container identification method and system are disclosed. The method includes: obtaining customs declaration information, and finding out an vehicle declared as an empty container or an empty vehicle from the customs declaration information; performing X-ray inspection on the vehicle to acquire a transmission image of the vehicle; inputting the transmission image into an empty container identification model obtained by pre-training, so that the empty container identification model determines candidate regions of the transmission image, and performs post-processing analysis on the candidate regions to obtain an image identification result; and comparing the image identification result with the corresponding customs declaration information to determine whether or not the image identification result is consistent with the customs declaration information.

12 Claims, 2 Drawing Sheets

(51) Int. Cl.
    *G06K 9/00*     (2006.01)
    *G06F 16/58*    (2019.01)
    *G06N 20/00*    (2019.01)
(52) U.S. Cl.
    CPC ......... *G06K 9/2018* (2013.01); *G06K 9/2054* (2013.01); *G06K 9/6257* (2013.01); *G06N 20/00* (2019.01); *G06K 2209/21* (2013.01); *G06K 2209/23* (2013.01)
(58) Field of Classification Search
    CPC ........... G06K 2209/21; G06K 2209/23; G06N 20/00; G06F 16/5866
    See application file for complete search history.

EMPTY CONTAINER IDENTIFICATION METHOD AND SYSTEM

CROSS-REFERENCE TO RELATED APPLICATION

This application claims the benefit of Chinese Patent Application No. CN201811632412.1 filed on Dec. 28, 2018 in the China National Intellectual Property Administration, the whole disclosure of which is incorporated herein by reference.

BACKGROUND OF THE DISCLOSURE

Field of the Disclosure

Embodiments of the disclosure generally relate to the technical field of radiation imaging safety inspection, and particularly, to empty container identification method and system for safety inspection of an empty container of a vehicle.

Description of the Related Art

X-ray transmission imaging technology, as a non-intrusive inspection method, is widely used in security inspection scenarios such as ports, customs, and border inspections to conduct risk assessment of vehicles passing through customs. Containers and vans are important transportation tools in modern logistics. In recent years, empty containers coming in border or crossing the border have been repeatedly used by criminals for smuggling. As important content of the intelligent identification function, the business requirement for intelligent empty container identification is very urgent. With the sharp increase in the volume of import and export trade, the way of manually verifying the images and giving the identification conclusions is far from meeting the needs of security inspection tasks. Therefore, the realization of the intelligent identification function that can replace the human eyes has become the research target of radiation imaging safety inspection technology.

There are currently two solutions for empty container identification or verification, namely a way of video surveillance and a way of weighing. For vehicles declared empty, the first way is to use cameras to monitor the vehicles passing the customs. This process requires opening the doors of the containers, and the monitoring personnel check the loading status of the containers through the images and draw conclusions. The biggest problem of this way is excessive human intervention, low customs clearance efficiency, and high misjudgment rate. The second way is to weigh the vehicles passing the customs and compare them with the recorded weight to obtain the risk index. This way requires recording the weight of the vehicles passing the customs, which can only be effective for smuggling with obvious weight deviation. Although the above two solutions already exist in the market, these solutions are only effective under certain conditions, and both have the problem of high missed detection rate or high false misinformation rate.

SUMMARY OF THE DISCLOSURE

An object of the present disclosure is intended to address at least one aspect of the above and other problems and deficiencies in the prior art.

According to an embodiment of one aspect of the present disclosure, there is provided an empty container identification method, comprising the following steps:

obtaining customs declaration information, and finding out an vehicle declared as an empty container or an empty vehicle from the customs declaration information;

performing X-ray inspection on the vehicle to acquire a transmission image of the vehicle;

inputting the transmission image into an empty container identification model obtained by pre-training, so that the empty container identification model determines or locates candidate regions of the transmission image, and performs post-processing analysis on the candidate regions to obtain an image identification result; and comparing the image identification result with the corresponding customs declaration information to determine whether or not the image identification result is consistent with the customs declaration information. In some embodiments, the image identification result comprises category information, location information, and confidence of the candidate regions.

In some embodiments, the empty container identification model is trained in a supervised learning way comprising the following steps:

establishing a training sample image database for empty container identification tasks, the training sample image database including training sample image data comprising training sample images and their corresponding annotation information;

determining and initializing a detection network, which is based on a convolutional neural network, according to the empty container identification tasks; and training the initialized detection network with the training sample image data to obtain the empty container identification model In some embodiments, the establishing a training sample image database for empty container identification tasks comprises:

amplifying abnormal image data using a sample enhancement method; and annotating the abnormal image data according to the empty container identification tasks.

In some embodiments, the training the initialized detection network with the training sample image data comprises:

scaling the training sample images and their annotation information into appropriate detection network input; and training the detection network with the following optimization function:

$$L = L_{cls} + \lambda L_{reg},$$

where, L represents a total loss of the training sample data;
$L_{cls}$ is a category loss of the training sample data;
$L_{reg}$ is a location regression loss of the training sample data; and
$\lambda$ is a control parameter.

In some embodiments, the performing X-ray inspection on the vehicle to acquire a transmission image of the vehicle comprises performing X-ray inspection only on a container of the vehicle to acquire a transmission image of the container of the vehicle.

In some embodiments, the method further comprises a step of pre-processing the transmission image before inputting the transmission image into the empty container identification model obtained by pre-training.

In some embodiments, the pre-processing comprises performing de-striping processing on the transmission image.

In some embodiments, the post-processing analysis comprises filtering out candidate regions with significantly small confidence by using a scoring threshold and through non-maximum suppression, and merging overlapping candidate regions near a same location region.

In some embodiments, the comparing the image identification result with the customs declaration information to determine whether it is consistent with the customs declaration information comprises:

determining that there is a lower risk if the image identification result is consistent with the customs declaration information; and determining that there is a higher risk if the image identification result is inconsistent with the customs declaration information.

According to another aspect of the present disclosure, there is provided an empty container identification system, comprising:

a data acquisition device, comprising:

a vehicle data extraction module adapted to find out a vehicle declared as an empty container or an empty vehicle from customs declaration information; and a transmission image acquisition module configured to perform X-ray inspection on the vehicle declared as an empty container or an empty vehicle to acquire a transmission image of the vehicle;

a data processor configured to identify the transmission image by using an empty container identification model so as to determine or locate candidate regions of the transmission image, and to perform post-processing analysis on the candidate regions to obtain an image identification result, and then to compare the image identification result with the corresponding customs declaration information to determine whether or not the image identification result is consistent with the customs declaration information; and a controller configured to control working status of the data acquisition device and the data processor.

In some embodiments, the transmission image acquisition module is configured to perform X-ray inspection only on a container of the vehicle declared as an empty container or an empty vehicle to acquire a transmission image of the container of the vehicle.

In some embodiments, the data processor further comprises a pre-processing module adapted to perform pre-processing on the transmission image acquired by the transmission image acquisition module.

In some embodiments, the data processor further comprises a post-processing module adapted to filter out candidate regions with significantly small confidence by using a scoring threshold and through non-maximum suppression, and to merge overlapping candidate regions near a same location region.

In some embodiments, the empty container identification system further comprises a storage device connected with the data acquisition device and the data processor and adapted to store the customs declaration information, the transmission image and the image identification result of the vehicle.

According to the empty container identification method and the identification system according to the various embodiments of the present disclosure, it determines whether or not the inspected vehicle is consistent with the declaration information by intelligently analyzing the transmission image of the vehicle declared as an empty container or an empty vehicle, thereby determining whether or not there is risk of concealment in the vehicle, that is, determining whether or not the vehicle involves false report or concealment, thus being able to replace manual automatic identification of transmission images to some extent, improving the customs clearance efficiency of empty containers or vans, and achieving "one-stop" intelligent inspection and release. The present disclosure can accurately determine whether or not a vehicle is empty without opening the container, and greatly reduce the workload of security personnel.

BRIEF DESCRIPTION OF THE DRAWINGS

The above and other features of the disclosure will become more apparent by describing in detail exemplary embodiments thereof with reference to the accompanying drawing, in which.

DETAILED DESCRIPTION OF EXEMPLARY EMBODIMENTS

Figure 1:
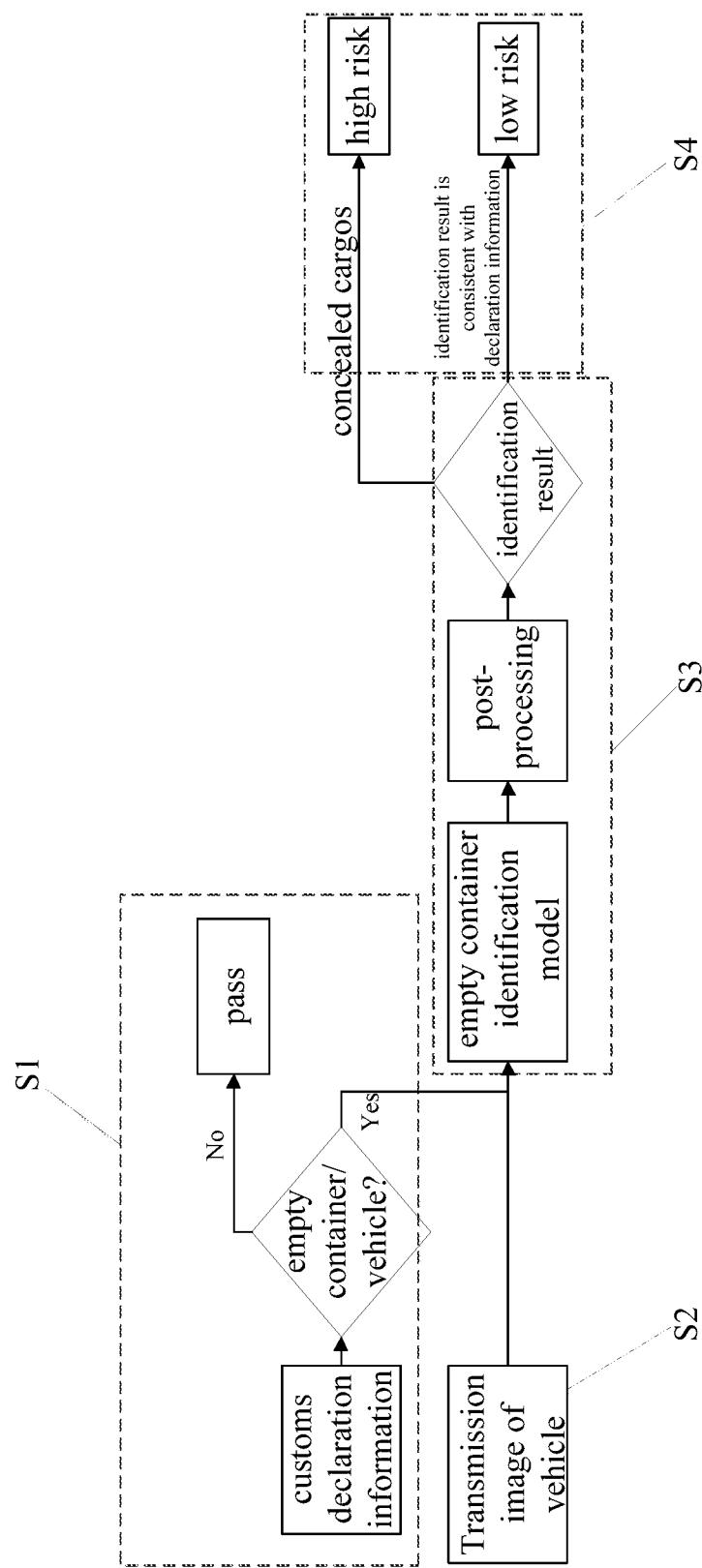
FIG. 1 is a schematic flowchart of an empty container identification method according to an exemplary embodiment of the present disclosure.

Although the present disclosure will be fully described with reference to the accompanying drawings containing preferred embodiments of the present disclosure, it should be understood before this description that those skilled in the art can modify the disclosure described herein while obtaining the technical effects of the disclosure. Therefore, it should be understood that the above description is a broad disclosure for those skilled in the art, and its content is not intended to limit the exemplary embodiments described in the present disclosure.

In addition, in the following detailed description, for purposes of explanation, numerous specific details are set forth in order to provide a thorough understanding of the embodiments of the disclosure. However, it may be evident, that one or more embodiments may be practiced without these specific details. In other instances, well-known structures and devices are shown in schematic form in order to simplify the drawing.

According to a general inventive concept of the present disclosure, there is provided an empty container identification method, comprising following steps: acquiring customs declaration information, and finding out an vehicle declared as an empty container or an empty vehicle from the customs declaration information; performing X-ray inspection on the vehicle to acquire a transmission image of the vehicle; inputting the transmission image into an empty container identification model obtained by pre-training, so that the empty container identification model determines or locates a candidate region of the transmission image, and performs post-processing analysis on the candidate region to obtain an image identification result; and comparing the image identification result with the corresponding customs declaration information to determine whether or not it is consistent with the customs declaration information.

FIG. 1 illustrates an exemplary embodiment of an empty container identification method according to the present disclosure. As shown in FIG. 1, the empty container identification method comprises following steps:

Step S1: acquiring customs declaration information, and extracting or finding out a vehicle 1, which has been declared as an empty container or an empty vehicle, from the customs declaration information. Specifically, the customs declaration information of vehicle 1 is acquired and a field, such as "HS_C", "VEHICLE_TYPE", "STATUS" or the like, where the empty container or the empty vehicle is located are extracted from the customs declaration information. If corresponding content of the field is "8609 ****" or "empty vehicle", it means that the declaration information of the vehicle 1** is an empty container or an empty vehicle.

Step S2: Performing X-ray inspection on the vehicle 1 declared as an empty container or an empty vehicle to acquire a transmission image of the vehicle 1. When the declaration information of the vehicle 1 is not an empty container or an empty vehicle, the X-ray inspection of the vehicle 1 is not performed.

Step S3: Inputting the acquired transmission image into an empty container identification model obtained by pre-training, so that the empty container identification model determines or locates candidate regions of the transmission image, and performs post-processing analysis, for example merging of categories and locations, on the candidate regions to obtain an image identification result. The transmission image can be pre-processed for example by de-striping, and then enter the trained empty container identification model for intelligent analysis to obtain the analysis result of the candidate region of the vehicle. The result includes category information, location information and confidence of the candidate regions. The category information may include, for example, "empty" and "anomaly", which can be specifically set on its own according to the task. For example, the location information can be represented by a rectangular frame which is obtained by acquiring coordinates $(x_1, y_1, x_2, y_2)$ of the rectangular frame, where $x_1$ and $y_1$ are coordinate values of a vertex of an upper left corner of the rectangular frame, and $x_2$ and $y_2$ are coordinate values of a vertex of a lower right corner of the rectangular frame. The confidence is a numerical value from 0 to 1. The larger the numerical value is, the higher the probability of a certain category indicates.

Step S4: Comparing the image identification result with the customs declaration information to determine whether or not it is consistent with the customs declaration information. In combination with the declaration information of customs declaration data, the above image identification result is analyzed. If the identification result is consistent with the declaration information, the risk is considered to be lower; if the identification result is inconsistent with the declaration information, the risk is considered to be higher. Specifically, according to the category information defined by the annotation data, if the category information of the identification result is "empty", it indicates that the vehicle 1 is an empty container or an empty vehicle, and the loading status of the vehicle 1 is consistent with the declaration information, thus the risk is lower; if the category information of the identification result is "anomaly", it indicates that the vehicle 1 is not an empty container or an empty vehicle, and there is a possibility of concealment, that is, the loading status of the vehicle 1 is inconsistent with the declaration information, thus the risk is higher. At the same time, location coordinates of the abnormal area can be obtained according to the location information.

In the above step S3, it is possible to filter out the candidate region with too or significantly small confidence by using a scoring threshold and through non-maximum suppression, and to merge overlapping candidate regions near a same location region to obtain a final image identification result. The specific process include: filtering out the rectangular frames of the candidate regions with smaller confidence by using the scoring threshold, and then merging the remaining rectangular frames by a non-maximum suppression method to leave, as a target region, only one rectangular frame with the highest confidence at a same location. The final identification result shows category information, location information, and confidence information about whether the target region is empty or not.

Figure 2:
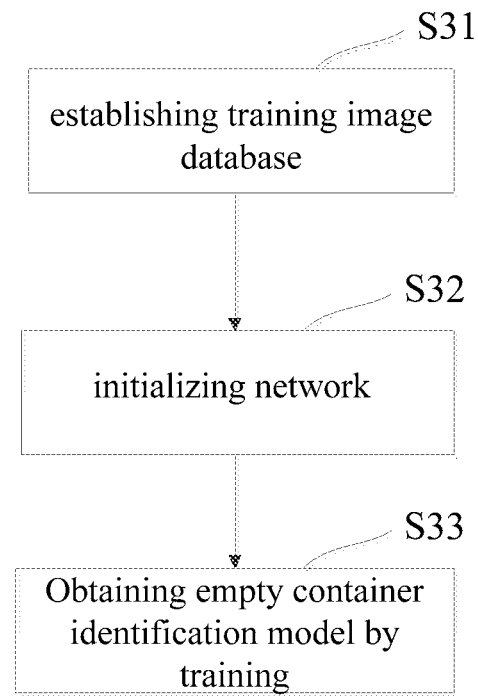
FIG. 2 is a schematic diagram of a training process of an empty container identification model according to an exemplary embodiment of the present disclosure.

As shown in FIG. 2, in an exemplary embodiment, the empty container identification model is obtained by using a supervised learning method, mainly comprising the following steps:

Step S31: Establishing a training sample image database for empty container identification tasks, the training sample image database including training sample image data comprising training sample images and their corresponding annotation information. Specifically, target data is firstly obtained. Here, the target data refers to transmission images of the vehicle 1, which has been declared as an empty container or an empty vehicle, and the transmission images comprise both an abnormal image of concealed cargo and a normal image. It is possible to amplify abnormal image data using a sample enhancement method since there are too few abnormal images in practice. The sample enhancement method includes cutting out concealed cargo regions from the historical images, then subjecting the cut images of the concealed cargo regions through random fusion processing and inserting the processed images into a container region of the normal image so that the processed images are disguised as training samples of a container with concealed cargos. The so-called random fusion processing is to fuse the cut regions to any location of the container region after performing a series of image processing operations on the cut regions, the series of image processing operations including but being not limited to at least one of the followings: rotation, flipping, adding random noise, changing grayscale, changing scale, etc. At the same time, considering that there are differences in the transmission images of different imaging devices, as many as possible device images are included when establishing the training database in order to ensure the generalization ability of the model. The training sample image database will be annotated according to empty container identification tasks since the empty container identification model is trained in a supervised learning way based on target detection. The annotation information comprises category information and location information of the target region. Among them, the category information indicates the category attribute of the target, that is, "empty" or "anomaly", and the location information is represented by the coordinates $(x_1, y_1, x_2, y_2)$ of a rectangular frame.

Step S32: Determining and initializing a detection network, which is based on a convolutional neural network, according to the empty container identification tasks; a faster-rcnn target detection network may be selected, or other end-to-end deep learning target detection structures may be selected. In this embodiment, a faster-rcnn target detection network will be taken as an example, which detection network has a basic network that is a convolutional neural network, and in which detection network category and location of multiple targets are optimized in a shared convolution way. Network parameters are modified according to the empty container identification tasks, and are initialized, for preparing for training the model.

Step S33: Training the initialized detection network with training data to obtain an empty container identification model. At first, training images and their annotation information in the established image database are inputted to the initialized detection network, and the empty container identification model is obtained through training. Among them, the images are scaled to a pixel range from 600 pixels to 1024 pixels, and the annotation information is changed accordingly at the same time. Then the detection network is trained with the following optimization function:

$$L=L_{cls}+\lambda L_{reg},$$

where, L represents a total loss of the training sample data;

$L_{cls}$ is a category loss of the training sample data;

$L_{reg}$ is a location regression loss of the training sample data; and

λ is a control parameter.

In some embodiments of the present disclosure, in order to improve customs clearance efficiency, a quick inspection mode may also be adopted; that is, when performing X-ray inspection on a vehicle, the X-ray inspection is only performed on the container of the vehicle, and only transmission image of the container of the vehicle is acquired.

Figure 3:
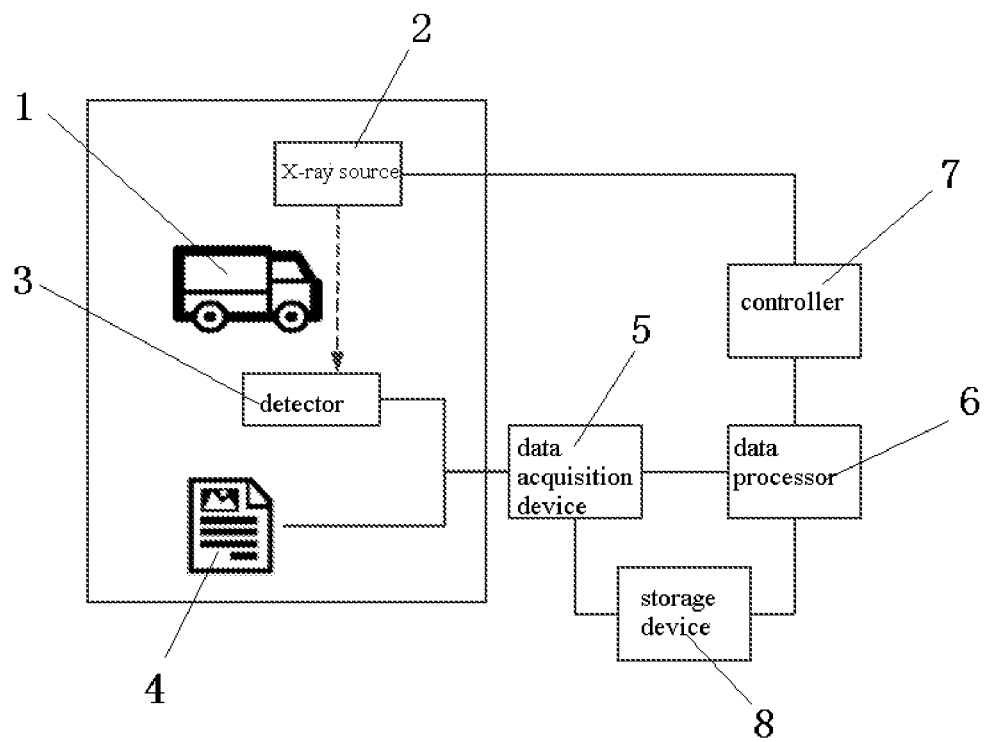
FIG. 3 is a schematic structural diagram of an empty container identification system according to an exemplary embodiment of the present disclosure.

FIG. 3 illustrates a structure of an inspection system according to an exemplary embodiment of the present disclosure. As shown in FIG. 3, the inspection system comprises a data acquisition device 5, a data processor 6, and a controller 7. The data acquisition device 5 comprises a vehicle data extraction module and a transmission image acquisition module, wherein the vehicle data extraction module is adapted to extract or find out a vehicle 1, which has been declared as an empty container or an empty vehicle, from the customs declaration information; the transmission image acquisition module is configured to perform X-ray inspection on the vehicle 1 to obtain transmission image of the vehicle 1. The data processor 6 uses the empty container identification model to identify the transmission image in order to locate the candidate regions of the transmission image, and performs post-processing analysis on the candidate regions to obtain an image identification result, and then compares the image identification result with corresponding customs declaration information to determine whether or not the image identification result is consistent with the customs declaration information. The controller 7 controls working states of the data acquisition device 5 and the data processor 6.

According to some embodiments, the transmission image acquisition module comprises a radiation imaging device composed of an X-ray source 2 and a detector 3, and the transmission image acquisition module is connected with the controller 7 so as to acquire the transmission image of the vehicle 1 under the control of the controller 7. The X-ray source 2 may be an isotope source, an X-ray machine, an accelerator, or the like, and the X-ray source 2 and the detector 3 each may be a single energy or dual energy type.

In some embodiments, the transmission image acquisition module is configured to perform X-ray inspection only on the container of the vehicle declared as an empty container or an empty vehicle to acquire the transmission image of the container of the vehicle, thereby improving customs clearance efficiency.

In some embodiments, the data processor 6 further comprises a pre-processing module adapted to perform pre-processing such as de-striping on the transmission image acquired by the transmission image acquisition module.

In some embodiments, the data processor 6 further comprises a post-processing module adapted to filter out candidate regions with too or significantly small confidence by using a scoring threshold and through non-maximum suppression and to merge overlapping candidate regions near a same location region.

As shown in FIG. 3, the empty container identification system further comprises a storage device 8 connected with the data acquisition device 5 and the data processor 6 respectively and adapted to store the customs declaration information, the transmission image, and the identification result of the vehicle 1.

According to the empty container identification method and system according to the above-mentioned various embodiments of the present disclosure, X-ray inspection is performed on a vehicle declared as an empty container or an empty vehicle to obtain the transmission image of the vehicle, and a trained empty container identification model is used to intelligently analyze pre-processed images to determine candidate interest regions of the transmitted image. The candidate regions are subjected to post-processing analysis such as merging of categories and locations so that the image identification result is obtained. The image identification result is compared with the declaration information so as to determine whether it is consistent with the declaration then a final risk assessment conclusion is obtained. In this way, it is possible to intelligently analyze whether a vehicle declared as an empty container or an empty vehicle has the risk of concealing cargo, and to determine the location of the suspected concealed cargo in the vehicle image to assist the final verifying and release decision. The system and method can accurately determine whether the cargo regions of a vehicle is empty without opening the container, which can greatly reduce the workload of security personnel, and can also be on duty for 24 hours.

Those skilled in the art will appreciate that the above-described embodiments are illustrative and can be modified by those skilled in the art, and that the structures described in the various embodiments can be freely combined without conflict in structure or principle.

After a detailed description of the preferred embodiments of the present disclosure, those skilled in the art will clearly understand that various changes and modifications can be made without departing from the scope and spirit of the appended claims, and the present disclosure is not limited to the implementation of the exemplary embodiments mentioned in the description.

What is claimed is:

1. An empty container identification method, comprising following steps:

obtaining customs declaration information, and finding out an vehicle declared as an empty container or an empty vehicle from the customs declaration information;

performing X-ray inspection on the vehicle to acquire a transmission image of the vehicle;

inputting the transmission image into an empty container identification model obtained by pre-training, so that the empty container identification model determines candidate regions of the transmission image, and performs post-processing analysis on the candidate regions to obtain an image identification result; and comparing the image identification result with the corresponding customs declaration information to determine whether or not the image identification result is consistent with the customs declaration information wherein the method further comprises a step of pre-processing the transmission image before inputting the transmission image into the empty container identification model obtained by pre-training, and the preprocessing comprises performing de-striping processing on the transmission image.

2. The empty container identification method of claim 1, wherein the image identification result comprises category information, location information, and confidence of the candidate regions.

3. The empty container identification method of claim 1, wherein the empty container identification model is trained in a supervised learning way comprising the following steps:
establishing a training sample image database for empty container identification tasks, the training sample image database comprising training sample images and their corresponding annotation information;
determining and initializing a detection network, which is based on a convolutional neural network, according to the empty container identification tasks; and
training the initialized detection network with the training sample image data to obtain the empty container identification model.

4. The empty container identification method of claim 3, wherein the establishing a training sample image database for empty container identification tasks comprises:
amplifying abnormal image data using a sample enhancement method; and
annotating the abnormal image data according to the empty container identification tasks.

5. The empty container identification method of claim 3, wherein the training the initialized detection network with the training sample image data comprises:
scaling the training sample images and their annotation information into appropriate detection network input; and
training the detection network with the following optimization function:

$$L=L_{cls}+\lambda L_{reg},$$

where, L represents a total loss of the training sample data;
$L_{cls}$ is a category loss of the training sample data;
$L_{reg}$ is a location regression loss of the training sample data; and
λ is a control parameter.

6. The empty container identification method of claim 1, wherein the performing X-ray inspection on the vehicle to acquire a transmission image of the vehicle comprises performing X-ray inspection only on a container of the vehicle to acquire a transmission image of the container of the vehicle.

7. The empty container identification method of claim 1, wherein the post-processing analysis comprises filtering out candidate regions with significantly small confidence by using a scoring threshold and through non-maximum suppression, and merging overlapping candidate regions near a same location region.

8. The empty container identification method of claim 1, wherein the comparing the image identification result with the customs declaration information to determine whether it is consistent with the customs declaration information comprises:
determining that there is a lower risk if the image identification result is consistent with the customs declaration information; and
determining that there is a higher risk if the image identification result is inconsistent with the customs declaration information.

9. An empty container identification system, comprising:
a data acquisition device, comprising:
a vehicle data extraction module adapted to find out a vehicle declared as an empty container or an empty vehicle from customs declaration information; and
a transmission image acquisition module configured to perform X-ray inspection on the vehicle declared as an empty container or an empty vehicle to acquire a transmission image of the vehicle;
a data processor configured to identify the transmission image by using an empty container identification model so as to determine candidate regions of the transmission image, and to perform post-processing analysis on the candidate regions to obtain an image identification result, and then to compare the image identification result with the corresponding customs declaration information to determine whether or not the image identification result is consistent with the customs declaration information; and
a controller configured to control working status of the data acquisition device and the data processor,
wherein the data processor further comprises a pre-processing module adapted to perform de-striping processing on the transmission image acquired by the transmission image acquisition module.

10. The empty container identification system of claim 9, wherein the transmission image acquisition module is configured to perform X-ray inspection only on a container of the vehicle declared as an empty container or an empty vehicle to acquire a transmission image of the container of the vehicle.

11. The empty container identification system of claim 9, wherein the data processor further comprises a post-processing module adapted to filter out candidate regions with significantly small confidence by using a scoring threshold and through non-maximum suppression, and to merge overlapping candidate regions near a same location region.

12. The empty container identification system of claim 9, further comprising a storage device connected with the data acquisition device and the data processor and adapted to store the customs declaration information, the transmission image and the image identification result of the vehicle.

* * * * *